Patented Mar. 28, 1944

2,345,427

UNITED STATES PATENT OFFICE 2,345,427

SOLVENT FOR ORGANIC FILM-FORMING MATERIALS

Walter Reppe and Otto Hecht, Ludwigshafen-on-the-Rhine, and Fritz Oschatz, Mannheim, Germany, assignors, by mesne assignments, to General Aniline & Film Corporation, New York, N. Y., a corporation of Delaware No Drawing. Application May 17, 1941, Serial No. 393,928. In Germany February 18, 1938

9 Claims. (Cl. 106—176)

This application is a continuation in part of our application Ser. No. 255,217, filed February 8, 1939, entitled "Solvents for organic film-forming materials," on which U. S. Patent 2,255,229 was issued September 9, 1941.

This invention relates to solvents for organic film-forming materials, especially those applicable to the manufacture of plastic masses, lacquers, priming compositions, covering colors, adhesives, foils, films, bands or artificial threads.

We have found that tetrahydrofurane and certain of its alkyl substitution products have an excellent solvent power for organic film-forming cellulose derivatives which are used as basic substances for lacquers and other plastic masses, such as cellulose esters and ethers. They are also compatible with other ingredients in commercial use in the preparation of lacquers, as for example with softening agents, plasticizers and the like.

The tetrahydrofuranes used as solvents according to our invention have the following formula:

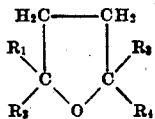

in which $R_1$, $R_2$, $R_3$ and $R_4$ are hydrogen or aliphatic hydrocarbon radicles of low molecular weight. The most simple member of this series is tetrahydrofurane itself, which is miscible both with water and with organic solvents, as for example with aromatic hydrocarbons and, therefore, is a very desirable solvent in the preparation of compositions of matter and plastic compositions containing cellulose esters or ethers. By the selection of the alkyl substituents in the tetrahydrofurane radicle it is possible to vary the solvent capacity, volatility and water-solubility of the substance as desired. Suitable alkyl substitution products are for example 2.5-dimethyltetrahydrofurane and 2.2.5.5-tetramethyltetrahydrofurane.

Tetrahydrofurane is suitable for dissolving cellulose derivatives, i. e., cellulose esters, as for example nitrocellulose and organic cellulose esters, e. g., cellulose acetate, propionate, butyrate and other esters, cellulose ethers, as for example ethyl or benzyl cellulose or cellulose ether esters. In addition to cellulose derivatives, the solutions may contain natural and synthetic resins, as for example manila copal, colophony or phenolaldehyde resins, etherified urea resins, such as are obtained for example by condensation of urea with formaldehyde or of dimethylol urea in alcohols, condensation products of resin acids or their esters with maleic acid, coumarone resins, and alkyd resins of various kinds, synthetic vinyl polymerization products, such as polyvinyl chloride, polyvinyl esters of organic acids, as for example polyvinyl acetate, polyvinyl ethers, polyvinyl carbazole, and also polyacrylic acid and polymethacrylic acid and their derivatives and interpolymerization products with different vinyl compounds.

Tetrahydrofurane also has a good solvent power for the waxes and drying oils used in the preparation of lacquers, as for example linseed oil, wood oil, oiticica oil or root oil, and also for the fundamental substances used in the preparation of asphalt lacquers.

The solutions prepared from tetrahydrofuranes and cellulose derivatives may have added to them the usual softening agents and also to a large extent adulterants. Thus for example solutions of acetyl cellulose in tetrahydrofurane may be even diluted with alcohol. Many of the dyestuffs used for coloring lacquers also have a good solubility in tetrahydrofuranes. Insoluble organic or inorganic fillers may, however, also be added to the lacquers.

The use of tetrahydrofurane as a solvent is very advantageous. It is stable and colorless, thereby being suitable for the production of clear or light colored lacquers and plastic compositions. It will be obvious from the foregoing explanations that it is possible according to our present invention to vary the properties of the compositions within very wide limits, and to fulfill all requirements of practice, for example the hardness, the time required for drying and the like.

The following examples will further illustrate how this invention may be carried out in practice, but the invention is not restricted to these examples. The parts are by weight.

Example 1

5 parts of a mixture of cellulose mononitrate and cellulose dinitrate, being readily soluble in butyl acetate and yielding solutions of medium viscosity, are dissolved in a mixture of 40 parts of tetrahydrofurane with 40 parts of benzene. The whole is admixed with 5 parts of tricresyl phosphate. The clear solution thus obtained rapidly dries to give colorless films which may be suitably used for coating metal surfaces.

Example 2

10 parts of the cellulose nitrate mixture described in Example 1, 3.5 parts of a 50 per cent butanol solution of an urea-formaldehyde resin obtained by the condensation of dimethylol urea in butanol and 7 parts of dibutyl phthalate are dissolved in a mixture of 30 parts of tetrahydrofurane, 15 parts of butyl acetate and 55 parts of toluene. The solution obtained may be used for coating wooden surfaces whereby strongly adhering films are obtained.

Example 3

15 parts of acetyl cellulose soluble in acetone and 15 parts of the neutral phthalic acid ester of ethylene glycol monomethyl ether are dissolved in 70 parts of tetrahydrofurane. The solution may be colored with an alcohol-soluble dyestuff, e. g. with the cyclohexylamine salt of the tetrazo dyestuff obtained by coupling the diazo compounds of ortho-nitraniline and metatoluidine with 1.8-aminohydroxynaphthalene-3.6 - disulfonic acid. The solution is suitable for coating cables which are protected by rubber and cotton fabric.

Example 4

12 parts of cellulose benzyl ether are dissolved in 85 parts of 2.5-dimethyl tetrahydrofurane while adding 3 parts of tricresyl phosphate or dibutyl phthalate. The lacquer thus obtained dries rapidly; it may be used for coating the inner surfaces of cans.

What we claim is:

1. A composition of matter comprising a cellulose derivative selected from the class consisting of cellulose esters and cellulose ethers dissolved in a compound corresponding to the formula

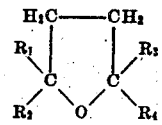

wherein R stands for members of the group consisting of hydrogen and low molecular aliphatic hydrocarbon radicles.

2. A composition of matter comprising a cellulose derivative selected from the class consisting of cellulose esters and cellulose ethers dissolved in tetrahydrofurane.

3. A composition of matter comprising a cellulose ester dissolved in tetrahydrofurane.

4. A composition of matter comprising cellulose acetate dissolved in tetrahydrofurane.

5. A composition of matter comprising cellulose nitrate dissolved in tetrahydrofurane.

6. A composition of matter comprising a cellulose ether dissolved in tetrahydrofurane.

7. A composition of matter comprising benzyl cellulose dissolved in tetrahydrofurane.

8. A composition of matter comprising a mixture of cellulose mononitrate and cellulose dinitrate dissolved in tetrahydrofurane.

9. A composition of matter comprising acetone-soluble cellulose acetate dissolved in tetrahydrofurane.

WALTER REPPE.
OTTO HECHT.
FRITZ OSCHATZ.